United States Patent
Hirth et al.

(10) Patent No.: US 8,548,323 B2
(45) Date of Patent: Oct. 1, 2013

(54) DAISY CHAINABLE ONU

(75) Inventors: Ryan Edgar Hirth, Windsor, CA (US); Robin C. Grindley, San Rafael, CA (US); Rajiv S. Dighe, Petaluma, CA (US); Glen Kramer, Petaluma, CA (US); Thyagarajan T. Subramanian, Rohnert Park, CA (US); Vafa Christopher Moezzi, San Francisco, CA (US); Edward Wayne Boyd, Petaluma, CA (US)

(73) Assignee: Broadcom Corporation, Irvine, CA (US)

( * ) Notice: Subject to any disclaimer, the term of this patent is extended or adjusted under 35 U.S.C. 154(b) by 207 days.

(21) Appl. No.: 13/088,995

(22) Filed: Apr. 18, 2011

(65) Prior Publication Data

US 2011/0262132 A1  Oct. 27, 2011

Related U.S. Application Data

(60) Provisional application No. 61/327,639, filed on Apr. 23, 2010.

(51) Int. Cl.
*H04J 14/00* (2006.01)

(52) U.S. Cl.
USPC ............................................................ 398/43

(58) Field of Classification Search
USPC ........................... 398/59; 370/445; 375/355
See application file for complete search history.

(56) References Cited

U.S. PATENT DOCUMENTS

| 7,551,612 B2* | 6/2009 | Kobayashi et al. ........... 370/368 |
| 8,160,192 B2* | 4/2012 | Lee et al. ...................... 375/354 |
| 2009/0238567 A1* | 9/2009 | Miller et al. .................... 398/59 |

* cited by examiner

*Primary Examiner* — Shi K Li
*Assistant Examiner* — Jamil Ahmed
(74) *Attorney, Agent, or Firm* — Sterne, Kessler, Goldstein & Fox P.L.L.C.

(57) ABSTRACT

Embodiments of a scalable optical network unit (ONU) architecture for multi-dwelling units (MDUs) that has a low initial cost (or first port cost) and a low maintenance cost are provided herein. The ONU architecture is scalable in that a growing number of end users can share a single drop fiber that couples the ONU to a passive optical network. The ONU architecture utilizes a multiplexer module to allow the ONU to be daisy chained with one or more additional ONUs.

19 Claims, 10 Drawing Sheets

DAISY CHAINABLE ONU

CROSS REFERENCE TO RELATED APPLICATIONS

This application claims the benefit of U.S. Provisional Patent Application No. 61/327,639, filed Apr. 23, 2010, entitled "Rack and Stack EPON MDUs," which is incorporated herein by reference in its entirety.

FIELD OF THE INVENTION

This application relates generally to optical network units (ONUs). More particularly, this application relates to ONUs for multi-dwelling units (MDUs).

BACKGROUND

The portion of the public network from the central office to the end user's location is called the access network, or "last mile." The access network connects the end user to the Internet (i.e., to the backbone or core network) via the central office. To keep pace with increasing internet traffic, network operators have, in many areas, upgraded existing access networks by deploying optical fibers deeper into the last mile to shorten the lengths of copper and coaxial networks.

Among different competing optical network technologies, passive optical networks (PONs) have been one of the favored choices for these next generation access networks. With the large bandwidth of optical fibers, PONs can accommodate bandwidth-intensive voice, data, and video services. Furthermore, PONs can be built with existing protocols, such as Ethernet and ATM, which facilitates interoperability between PONs and other network equipment.

FIG. 1 illustrates an exemplary PON 100 that includes a central office 110, a single family unit (SFU) 120, and a multi-dwelling unit (MDU) 130 (i.e., a structure housing two or more residential or business units). Transmissions within PON 100 are performed between an optical line terminal (OLT), at central office 110, and optical network units (ONUs), at SFU 120 and MDU 130, over optical fibers that span the distance between them. The OLT at central office 110 couples PON 100 at its end to a metro backbone (not shown), which can be an external network belonging to, for example, an Internet service provider (ISP) or a local exchange carrier. In addition, the ONUs at SFU 120 and MDU 130 further couple PON 100 at their ends to home or business networks through customer-premises equipment (CPE) (also not shown). It is this network structure that allows end user devices coupled to home or business networks within SFU 120 and MDU 130 to send data to and receive data from the metro backbone over PON 100.

The portion of PON 100 closest to central office 110 is commonly referred to as the feeder area 150. This area includes one or more feeder cables that each has multiple fibers. Passive optical splitters/combiners 140 are used to split the individual fibers of the feeder cables into multiple distribution fibers that fall within the second portion of PON 100, which is commonly referred to as the distribution area 160. The distribution fibers are then further split by additional passive optical splitters/combiners 140 into multiple drop fibers that extend to SFU 120 and MDU 130. The drop fibers fall within the third and final portion of PON 100, which is commonly referred to as the drop area 170.

In general, signals sent downstream over these three portions of PON 100, by the OLT at central office 110, are split by passive optical splitters/combiners 140 and are received by the ONUs at SFU 120 and MDU 130. Conversely, signals sent upstream over these three portions of PON 100, by the ONUs at SFU 120 and MDU 130, are combined by passive optical splitters/combiners 140 and are received by the OLT at central office 110. To avoid collisions in the upstream direction and to share the fiber-channel capacity fairly, the OLT at central office 110 and the ONUs at SFU 120 and MDU 130 implement some form of arbitration.

It should be noted that PON 100 illustrates only one exemplary fiber distribution topology (i.e., a tree topology) and that other point-to-multipoint fiber distribution topologies, such as ring and mesh topologies, are possible.

In prior access networks, distribution area 160 and/or drop area 170 were deployed using copper and coaxial cables. By extending fiber cables deeper into the access network, all the way to the home and building, PON 100 can accommodate bandwidth-intensive voice, data, and video services that these prior access networks could not handle. In general, the only remaining portion of the network between central office 110 and an end user's device at SFU 120 and MDU 130 that potentially is not optically connected, is within the local area networks at these locations (i.e., within metallic area 180). However, over such short copper and/or coaxial wiring distances, current local area network technology generally provides adequate bandwidth.

Although PON 100 improves the performance of the last mile, the number of drop fibers available within drop area 170 cannot easily be increased without potentially adding additional feeder and distribution cables, which can be an expensive undertaking. This is a direct result of the passive nature of PON 100 which uses passive devices (i.e., passive optical splitters/combiners 140) that do not require power to split optical signal power from one fiber into several fibers. Typically, a single fiber from the OLT at central office 110 is limited to being split into 32 different drop fibers (although 64, 128, and even higher splits are possible). Therefore, drop fibers are a fairly valuable commodity.

For SFUs, such as SFU 120, there is generally no way around running a dedicated drop fiber to the boundary of the home to be used by a single end user or end user family. However, in MDUs, such as MDU 130, which includes two or more residences or businesses, there exists a potential to share a single drop fiber among multiple residences and/or businesses and their respective end users.

Current implementations of ONUs for MDUs, such as MDU 130, either provide a scalable solution (i.e., one which allows a growing number of end users to share a single drop fiber) at a high initial cost, or a non-scalable solution (i.e., one which only allows a fixed number of end users to share a single drop fiber) at a relatively low initial cost. In addition, the conventional scalable solutions typically have high associated maintenance costs due to their architectures.

Therefore, what is needed is a scalable ONU solution for an MDU that has a low initial cost (or first port cost) and low associated maintenance costs.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the invention. However, it will be apparent to those skilled in the art that the invention, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

1. Conventional ONUs for MDUs

Figure 1:
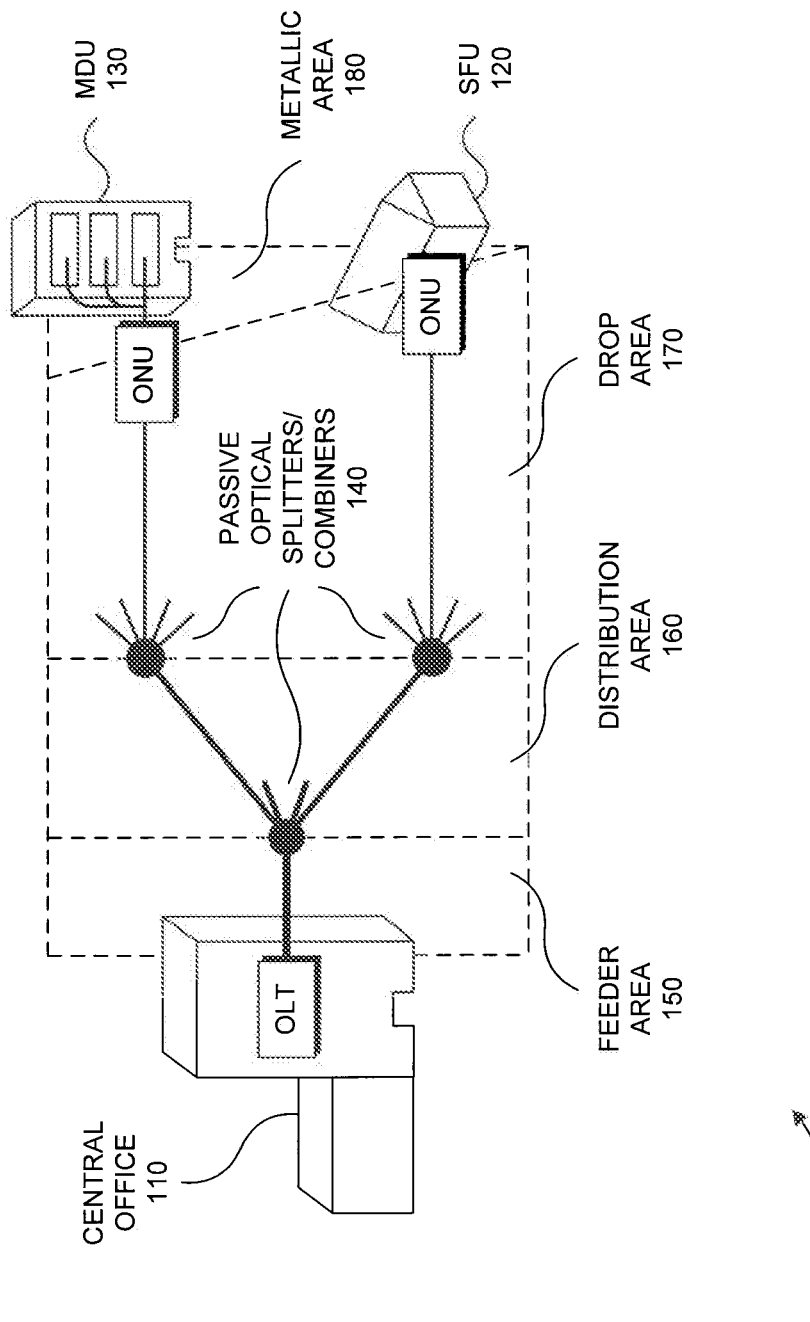
FIG. 1 illustrates an exemplary PON.
Figure 2:
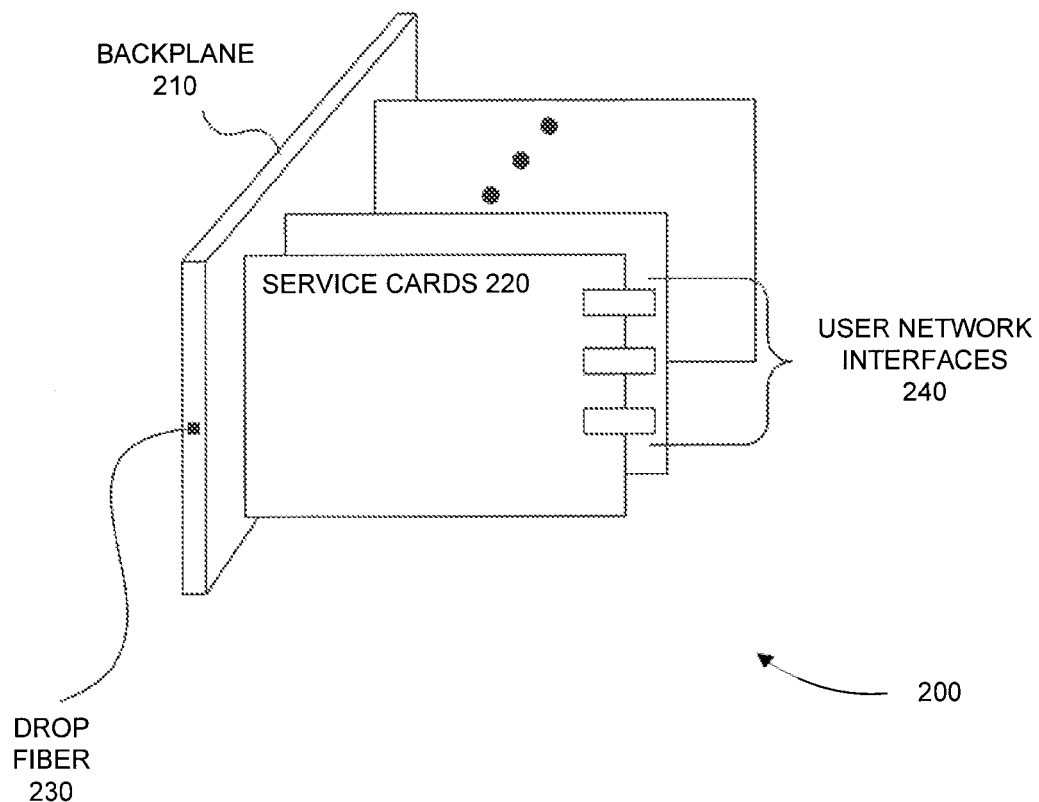
FIG. 2 illustrates a conventional chassis based MDU ONU.

FIG. 2 illustrates a conventional chassis based MDU ONU 200 that includes a backplane (or central card) 210 and one or more service cards (or line cards) 220 that are plugged into communication slots of backplane 210. Backplane 210 includes a PON interface and ONU logic (not shown) that receive and convert optical signals sent downstream over a PON, via drop fiber 230, into electrical signals for distribution to service cards 220. In addition, the PON interface and ONU logic included on backplane 210 receive and convert electrical signals from service cards 220 into optical signals for transmission upstream over drop fiber 230.

Service cards 220 are responsible for formatting the electrical signals received from the ONU logic on backplane 210 into one or more communication or networking standards (e.g., DSL, Ethernet, TDM, etc.) for final distribution to end users and their respective devices coupled to network interfaces 240. In addition, service cards 220 are responsible for formatting the electrical signals received from end users and their associated devices coupled to network interfaces 240 into the proper format expected by the ONU logic on backplane 210, such that the data contained within those signals can be sent upstream over drop fiber 230.

In general, chassis based MDU ONU 200 provides a scalable solution (i.e., one which allows a growing number of end users or residences to share single drop fiber 230). It accomplishes this by allowing additional service cards to be added to backplane 210 up to its capacity. However, chassis based MDU ONU 200 suffers from excessive initial cost (or first-port cost) as backplane 210 needs to be designed to handle the highest potential capacity of the system up front (i.e., the full number of service cards 220 desired to be supported) even though the number of end users or occupied residences in an MDU at any given point in time may not demand the full capacity.

Also, chassis based MDU ONU 200 has a high associated maintenance cost due to its architecture. The architecture of MDU ONU 200 generally requires trained service people to go out to the field where MDU ONU 200 is located (for example in the basement of an MDU or near a boundary of an MDU, such as a curb) to replace and/or add service cards 220 to backplane 210.

Figure 3:
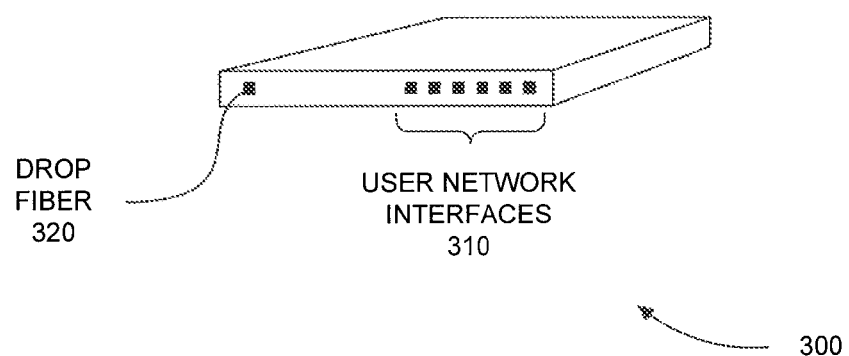
FIG. 3 illustrates another conventional pizza box MDU ONU.

Turning now to FIG. 3, another conventional MDU ONU is illustrated. In particular, FIG. 3 illustrates a conventional pizza box MDU ONU 300 that includes ONU logic (not shown) for interfacing end user devices via a fixed number of user network interfaces 310 to a drop fiber 320, which is part of a PON network. It performs this interfacing function in the same general manner as described above in regard to FIG. 2.

The architecture of conventional pizza box MDU ONU 300 is advantageous because of its low initial cost and maintenance cost. It does not employ the use of a backplane having a large number of expansion slots for coupling to service cards for handling a growing end user base. Although this reduces the overall cost of conventional pizza box MDU ONU 300 and the cost of maintaining it, it does not allow conventional pizza box MDU ONU 300 to share drop fiber 320 with an expanding end user population. Rather, conventional pizza box MDU ONU 300 provides a non-scalable solution (i.e., one which only allows a small, fixed number of end users or residences to share drop fiber 320).

Embodiments of the present invention, discussed further below, are directed to a scalable ONU architecture for MDUs that has a low initial cost (or first port cost) and a low maintenance cost. In other words, embodiments of the present invention combine the scalability advantage associated with the chassis based MDU ONU 200 illustrated in FIG. 2 with the low initial cost (or first port cost) and low maintenance cost advantage associated with the pizza box MDU ONU 300 illustrated in FIG. 3.

2. Daisy Chainable ONU for MDUs

Figure 4A:
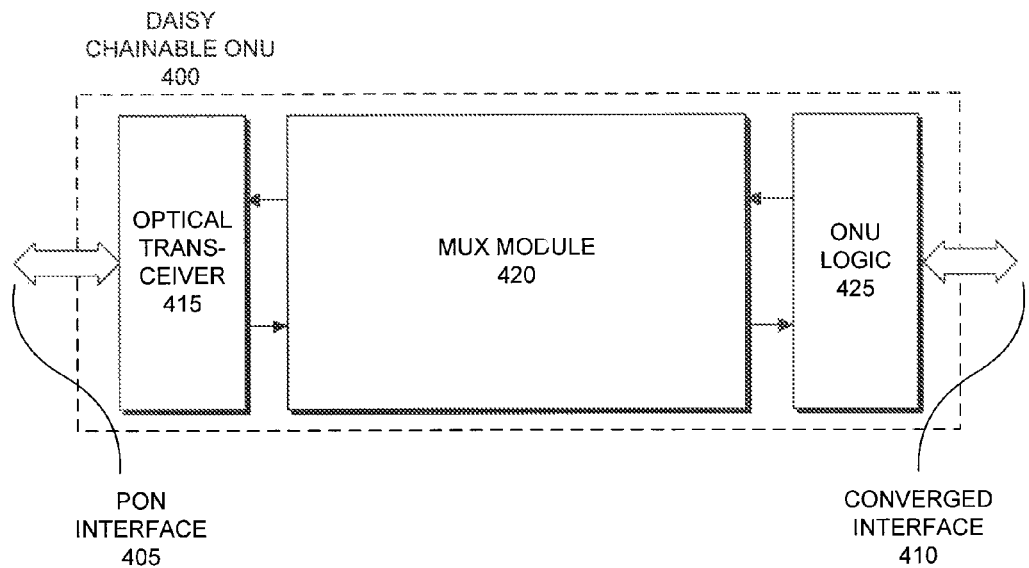
FIG. 4A illustrates a block diagram of a daisy chainable MDU ONU, according to embodiments of the present invention.

FIG. 4A illustrates a daisy chainable ONU 400, according to embodiments of the present invention. Daisy chainable ONU 400 is configured to terminate a PON at PON interface 405 and present a converged interface 410 to end users within an MDU, such that the end users can send and receive data over the PON. In an embodiment, converged interface 410 provides one or more interfaces such as xDSL, coax, and Ethernet that are coupled to the end users through network termination equipment (not shown). The network termination equipment provides separate, native service interfaces to the end users. In another embodiment, converged interface 410 provides one or more interfaces such as xDSL, coax, and Ethernet that are directly coupled to the end users. Daisy chainable ONU 400 can be placed within a pizza box type housing for deployment in the field.

As illustrated in FIG. 4A, daisy chainable ONU 400 includes an optical transceiver 415, a multiplexer (mux) module 420, and ONU logic 425. Optical transceiver 415 is configured to transmit optical signals to and receive optical signals from the PON coupled to PON interface 405 via a single drop fiber (not shown). In one embodiment, optical transceiver 415 is configured to simultaneously transmit and receive optical signals over the drop fiber coupled to PON interface 405. The optical signals received by optical transceiver 415 are converted into electrical signals and are passed on to ONU logic 425 through mux module 420 for distribution to the end users. In addition, the optical signals transmitted over the PON by optical transceiver 415 are derived from electrical signals received from ONU logic 425 through mux module 420.

Upon receiving downstream transmissions, ONU logic 425 is configured to extract frames of data from the electrical signals passed to it by optical transceiver 415 that are designated for the end users coupled to its converged interface 410. ONU logic 425 can perform this extraction based on a logical link identifier (LLID) transmitted with each frame of data sent over the PON from an OLT at a central office. For example, ONU logic 425 can be assigned an LLID that identifies data intended for it and, thereby, the end users coupled to converged interface 410. ONU logic 425 can accept and buffer the frames of data, sent downstream from the OLT over the PON, that carry its assigned LLID, while ignoring frames of data with LLIDs other than its own. The buffered packets can then be passed on to the appropriate end users coupled to converged interface 410 by ONU logic 425.

In the upstream direction, the channel capacity of the PON is shared by multiple ONUs. As a result, upstream transmissions from each ONU attached to the PON are arbitrated to avoid collisions. This arbitration can be achieved by allocating a transmission window (also called a grant) to each ONU. In this scheme, an ONU defers transmission until its grant arrives. A multipoint control protocol (MPCP) can be used to assign transmission slots to ONUs. The MPCP can employ, for example, REPORT control messages (upstream messages sent by the ONU to inform the OLT of its upstream queue status) and GATE control messages (downstream messages sent by the OLT granting bandwidth to ONUs) to request and assign transmission opportunities on the PON.

In one embodiment, ONU logic 425 is configured to transmit REPORT control messages to the OLT that include its LLID and information regarding its upstream queue(s) (e.g., the amount of end user data currently stored therein). ONU logic 425 is further configured to transmit end user data stored in its upstream queue(s) in accordance with transmission opportunities granted by GRANT control messages received from the OLT.

It should be noted that, in at least one embodiment, ONU logic 425 is assigned and maintains multiple LLIDs (e.g., 8-16 LLIDs) and that these LLIDs can be associated directly with itself and/or the end users attached thereto.

Mux module 420 sits between optical transceiver 415 and ONU logic 425 and is configured to pass data between these two devices, as noted above. In addition, mux module 420 is further configured to allow optical transceiver 415 to be shared by one or more additional daisy chainable ONUs (not shown). By allowing one or more additional daisy chainable ONUs to share and use optical transceiver 415 to transmit and receive data over the PON coupled to PON interface 405 via a single drop fiber, that single drop fiber can potentially be shared among many more end users than ONU logic 425 is capable of supporting itself. This provides scalability.

Beyond allowing one or more additional daisy chainable ONUs to share optical transceiver 415, mux module 420 can further be configured to allow ONU logic 425 to share an optical transceiver contained within one or more additional daisy chainable ONUs. These and other features of mux module 420 are discussed further below in regard to FIG. 4B.

Figure 4B:
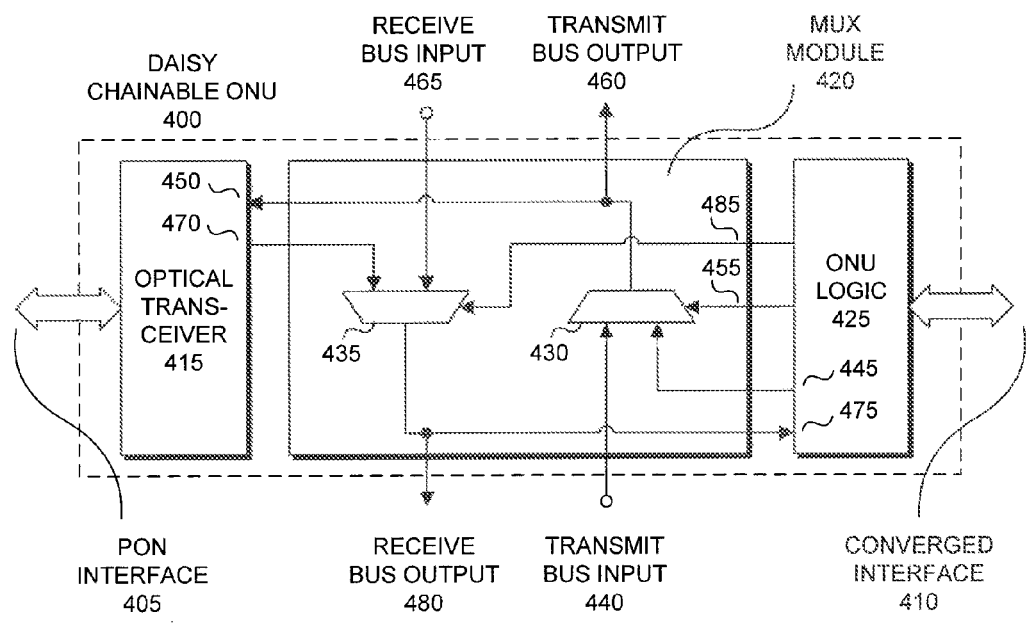
FIG. 4B illustrates a block diagram of a daisy chainable MDU ONU and further implementation details of a MUX module contained therein, according to embodiments of the present invention.

In FIG. 4B, a specific embodiment of mux module 420 is illustrated within the structure of daisy chainable ONU 400, according to embodiments of the present invention. As illustrated in FIG. 4B, mux module 420 includes a transmit multiplexer (mux) 430 and a receive multiplexer (mux) 435.

Transmit mux 430 includes two inputs, one of which is coupled to transmit bus input 440 and the other of which is coupled to ONU transmit output 445. Transmit bus input 440 is coupled to an additional daisy chainable ONU (not shown) and is configured to receive and provide data to be transmitted over the PON, via optical transceiver 415, from the additional daisy chainable ONU and, potentially, other ONUs that are further daisy chained off of it. ONU transmit output 445 provides data from ONU logic 425 to be transmitted upstream over the PON.

In operation, transmit mux 430 is configured to couple one of these two inputs to its output, which is coupled to PON transmit input 450 of optical transceiver 415. Data received at PON transmit input 450 is converted to an optical signal by optical transceiver 415 and is transmitted over the PON coupled to PON interface 405.

Each daisy chainable ONU providing data to optical transceiver 415, has ONU logic that operates in accordance with the same (or a very similar) multipoint control protocol (MPCP) as ONU logic 425. Thus, because this MPCP avoids upstream transmission collisions between the ONUs using an arbitration mechanism, such as the GRANT/REQUEST mechanism discussed above, only one of the daisy chainable ONUs should be transmitting at any given time (assuming they are all transmitting over the same wavelength).

Given this, if ONU logic 425 is currently transmitting data in accordance with a GRANT message received from the OLT, no other ONUs should be currently transmitting and ONU logic 425 controls transmit mux 430 via transmit mux control signal 455 to couple its ONU transmit output 445 to PON transmit input 450. At other times, when ONU logic 425 is not transmitting, ONU logic 425 can go passive and control transmit mux via transmit mux control signal 455 to couple transmit bus input 440 to PON transmit input 450. This allows the other daisy chainable ONU coupled to transmit bus input 440 (and any other daisy chainable ONUs coupled off of it) a chance to transmit data over the PON.

The output of transmit mux 430 can be further coupled to the transmit bus input of another daisy chainable ONU via transmit bus output 460. It is in this way that ONU logic 425 (and those ONUs daisy chained off of it) can use an optical transceiver belonging to another daisy chainable ONU for transmitting data over the PON.

Turning now to receive mux 435, this mux includes two inputs, one of which is coupled to receive bus input 465 and the other of which is coupled to PON receive output 470. PON receive output 470 provides an electrical signal of the data received over the PON coupled to PON interface 405. Receive bus input 465 is coupled to an additional daisy chainable ONU (not shown) and is configured to provide the data received over the PON by the optical transceiver of the additional daisy chainable ONU (or from the optical transceiver of an ONU daisy chained off of it) to daisy chainable ONU 400.

In operation, receive mux 435 is configured to couple one of these two inputs to its output, which is coupled to ONU receive input 475 and to receive bus output 480. Receive bus output 480 is coupled to an additional daisy chainable ONU (not shown) and is configured to pass on data received by optical transceiver 415 over the PON or data received over receive input 465 to the ONU logic of the additional daisy chainable ONU.

If optical transceiver 415 is being used to receive data over the PON, then ONU logic 425 controls receive mux 435 via receive mux control signal 485 to couple PON receive output 470 to ONU receive input 475 and to receive bus output 480. If, on the other hand, optical transceiver 415 is not being used to receive data over the PON, and some other optical transceiver in an additional daisy chainable ONU (not shown) coupled to receive bus input 465 is being used to receive data over the PON, then ONU logic 425 controls receive mux 435 via receive mux control signal 485 to couple receive bus input 465 to ONU receive input 475 and to receive bus output 480.

Figure 5:
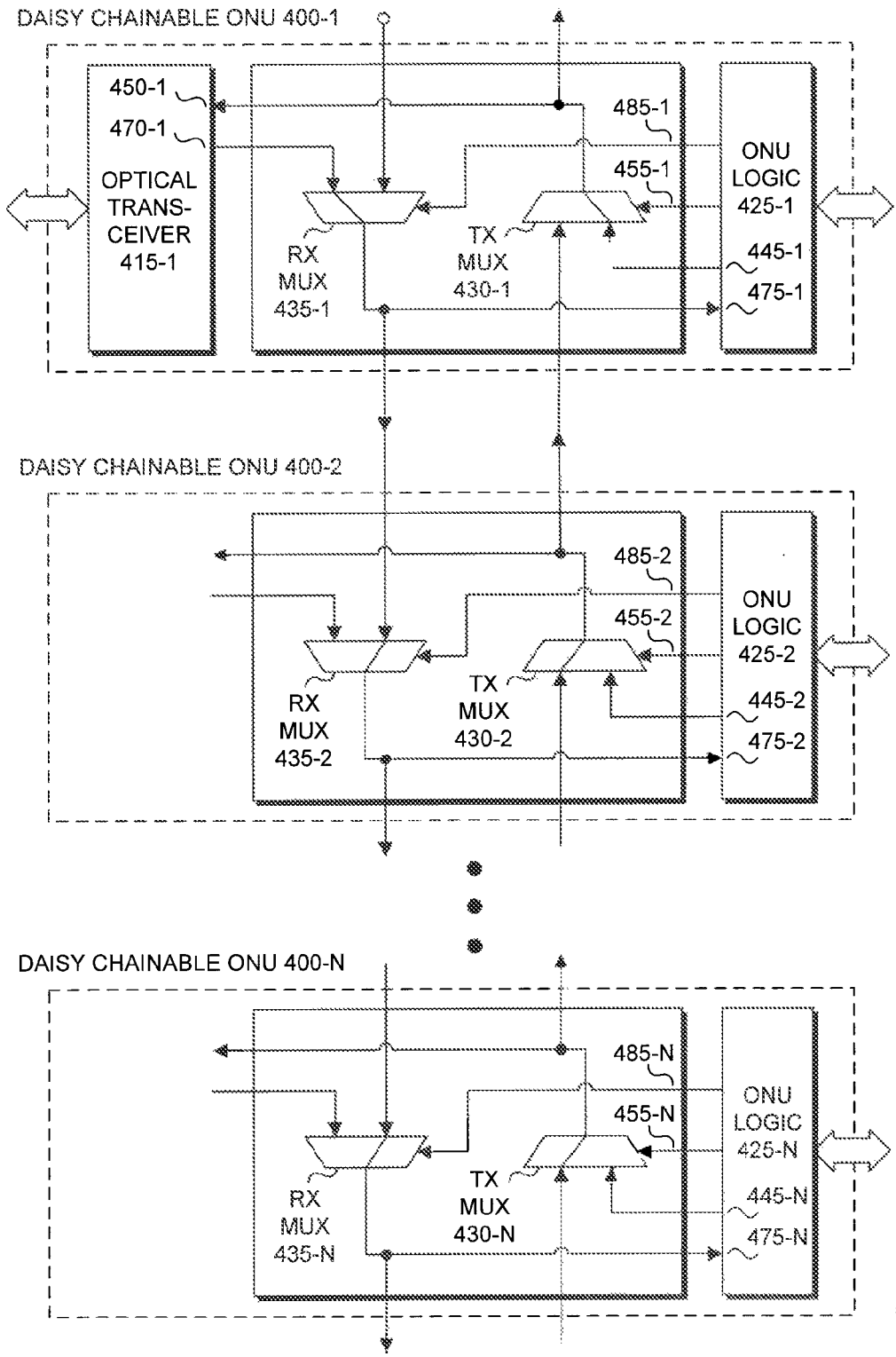
FIG. 5 illustrates a number of the MDU ONUs illustrated in FIG. 4B coupled together in a daisy chain fashion, according to embodiments of the presented invention.

FIG. 5 illustrates a number of the MDU ONUs illustrated in FIG. 4B (i.e., MDU ONU 400) coupled together in a daisy chain fashion, according to embodiments of the presented invention. In particular, FIG. 5 illustrates N of the MDU ONUs illustrated in FIG. 4B coupled together in a daisy chain fashion, where N is an integer number. For ease of illustration, internal reference numbers have been omitted.

As configured in FIG. 5, daisy chainable ONU 400-1 is the only daisy chainable ONU within the group that includes an optical transceiver. The other daisy chainable ONUs 400-2-N all share the single drop fiber (not shown) coupled to the optical transceiver of daisy chainable ONU 400-1 for sending and receiving data over the PON. As a result, the receive mux of daisy chainable ONU 400-1 couples the data received over the PON by the optical transceiver of daisy chainable ONU 400-1 to its output, thereby by passing this received data to the ONU logic of daisy chainable ONU 400-1 and to daisy chainable ONUs 400-2-N, as shown. The receive muxs of daisy chainable ONUs 400-2-N, in order to pass the data received over the PON to their respective ONU logic modules, are configured to select the opposite input as the receive mux of daisy chainable ONU 400-1, as further shown.

Each transmit mux of daisy chainable ONUs 400-1-N couples the transmit output of the ONU logic within its respective daisy chainable ONU to its mux output when the ONU logic is currently transmitting data. Because each daisy chainable ONU operates in accordance with the same (or a very similar) multipoint control protocol (MPCP), only one daisy chainable ONU 400-1-N should be transmitting at any given point in time (assuming they are all transmitting over the same wavelength). In the illustration of FIG. 5, daisy chainable ONU 400-1 is currently transmitting and, as a result, its transmit mux is controlled to couple the transmit output of its ONU logic to its mux output. All other transmit muxs, belonging to daisy chainable ONUs 400-2-N, are in passive mode. If, on the other hand, the ONU logic of daisy chainable ONU 400-2 is currently transmitting, its transmit mux is controlled to couple the transmit output of its ONU logic to its mux output, while all other transmit muxs belonging to the remaining daisy chainable ONUs are in passive mode.

It should be noted that the daisy chain connections between daisy chainable ONUs 400-1-N can be made by electrical and/or optical cables. In addition, it should be noted that each daisy chainable ONU 400-1-N can be contained within a rackable box, such as a pizza box type container and can be stacked on top of each other in a rack or positioned on separate floors in an MDU, for example. Finally, it should be noted that an additional daisy chainable ONU can be daisy chained off the i/o illustrated at the bottom of daisy chainable ONU 400-N, thereby providing scalability.

3. Daisy Chained ONUs with Added Fault Protection

Figure 6A:
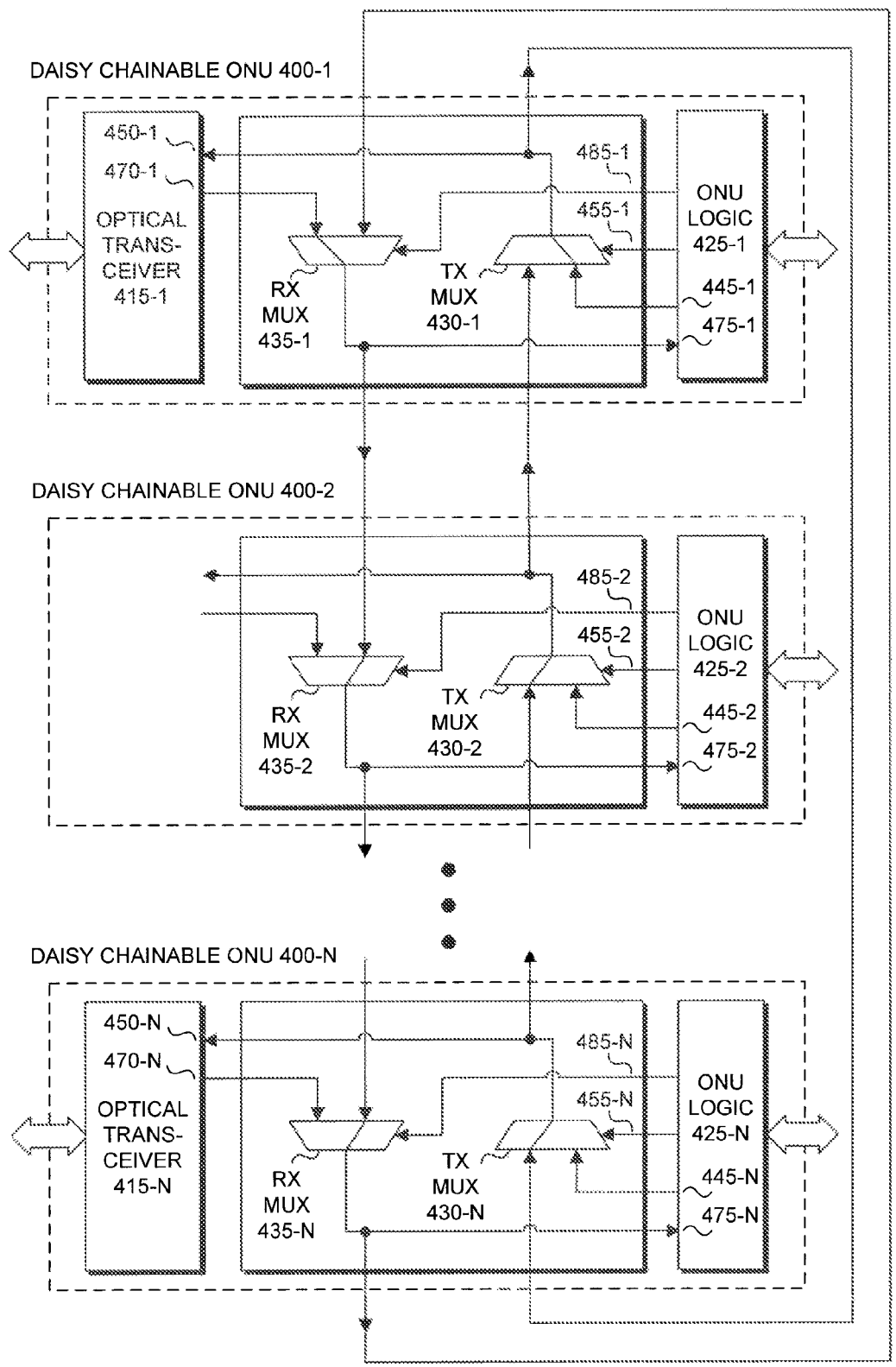
FIG. 6A illustrates a number of the MDU ONUs illustrated in FIG. 4B coupled together in a daisy chain fashion with added fault protection, according to embodiments of the presented invention.

FIG. 6A illustrates a number of the MDU ONUs illustrated in FIG. 4B (i.e., MDU ONU 400) coupled together in a daisy chain fashion with added fault protection, according to embodiments of the presented invention. FIG. 6A specifically illustrates the same daisy chainable MDU ONUs illustrated in FIG. 5 with the addition of a second optical transceiver in daisy chainable ONU 400-N and additional daisy chain cables coupling the daisy chain i/o of daisy chainable ONU 400-N to the daisy chain i/o of daisy chainable ONU 400-1, as illustrated.

In general, MDU ONUs illustrated in FIG. 6A can operate in the same manner as described above in FIG. 5 and solely use the optical transceiver in daisy chainable ONU 400-1 for transmitting and receiving data over the PON via the drop fiber coupled thereto. However, in the event that the optical transceiver in daisy chainable 400-1 experiences a fault and is no longer able transmit and/or receive data over the PON, daisy chainable ONUs 400-1-N can transition to the optical transceiver in daisy chainable ONU 400-N, and use it to transmit and receive data over the PON. This fault scenario is illustrated in FIG. 6B.

Figure 6B:
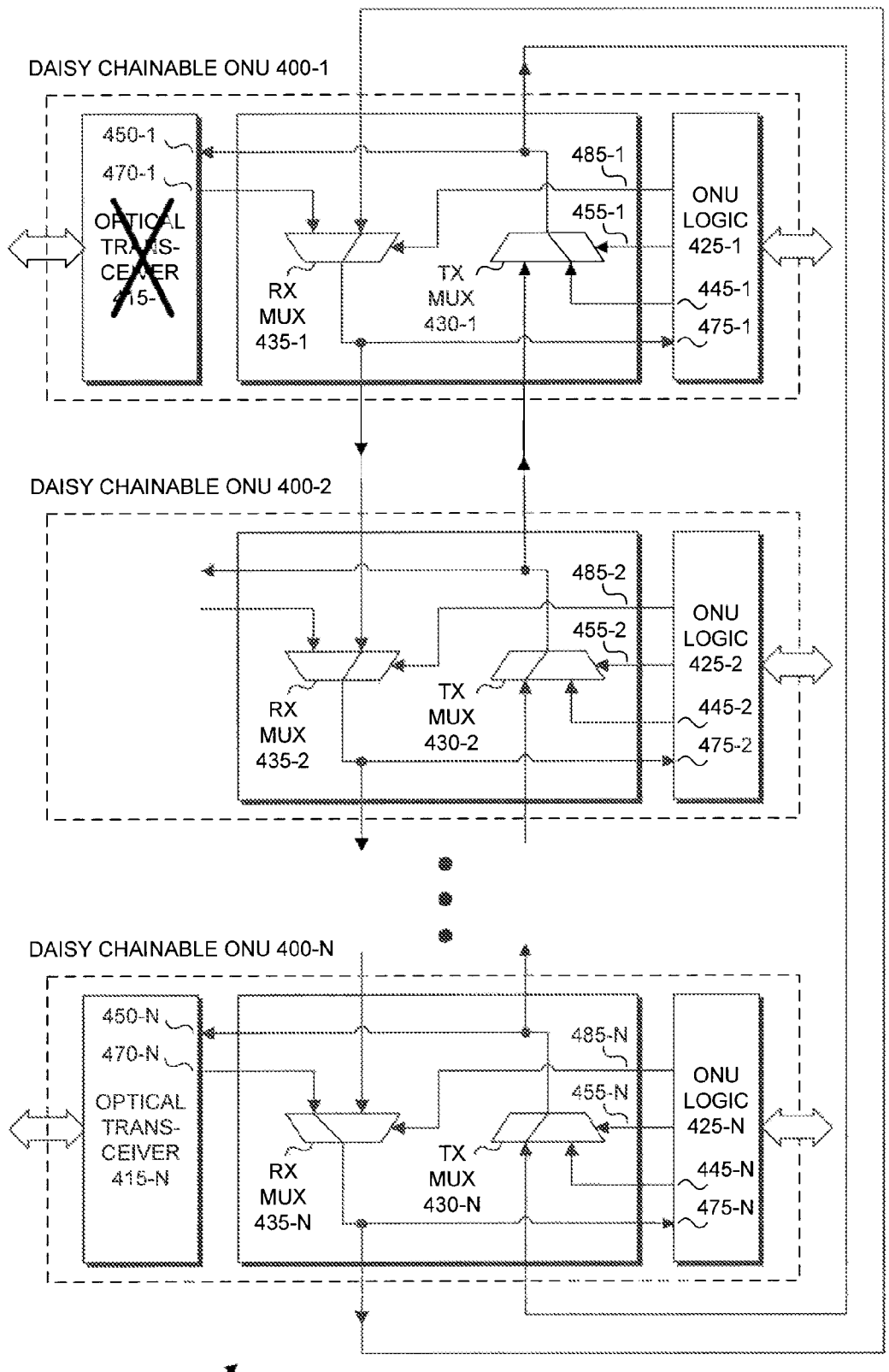
FIG. 6B illustrates a number of the MDU ONUs illustrated in FIG. 4B coupled together in a daisy chain fashion that are currently utilizing the added fault protection, according to embodiments of the presented invention.

In using this additional optical transceiver as illustrated in FIG. 6B, the main difference in operation of daisy chainable ONUs 400-1-N is in the control of their receive muxs. The receive mux of daisy chainable ONU 400-N now couples the data received over the PON by the optical transceiver of daisy chainable ONU 400-N to its output, thereby passing this received data to the ONU logic of all other daisy chainable ONUs, as shown. The receive muxs of all other daisy chainable ONUs are configured to select the opposite input as that of daisy chainable ONU 400-N, as further shown in FIG. 6B, in order to pass the data received over the PON to their respective ONU logic modules (and to other daisy chainable ONUs coupled off of it).

It should be noted that the second optical transceiver can be positioned within any one of the daisy chainable ONUs illustrated in FIG. 6B and is not limited to being positioned within daisy chainable ONU 4-N, as illustrated.

4. Daisy Chainable ONU for MDUs with Added Load Balancing Logic

Figure 7:
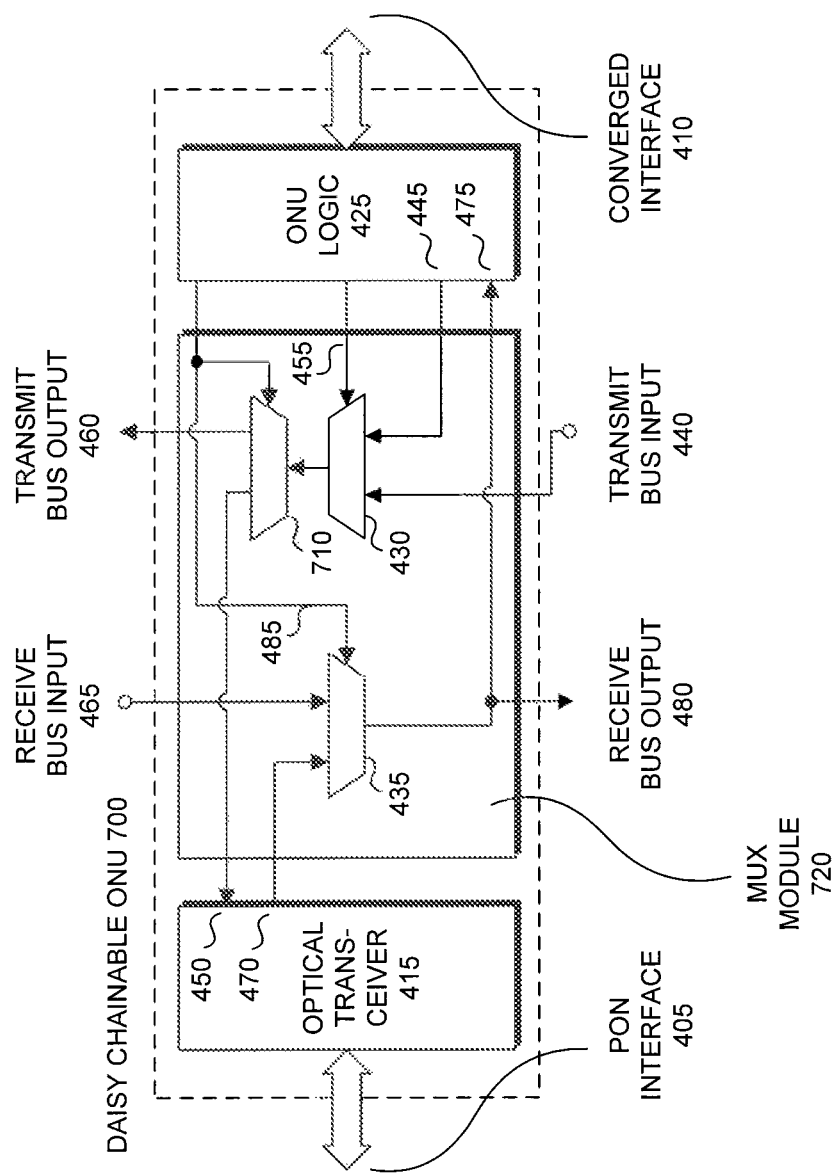
FIG. 7 illustrates a block diagram of a daisy chainable MDU ONU and implementation details of a MUX module contained therein having added load balancing logic, according to embodiments of the present invention.

FIG. 7 illustrates a block diagram of a daisy chainable MDU ONU 700 and implementation details of a mux module 720 contained therein having added load balancing logic, according to embodiments of the present invention. In particular, MDU ONU 700 contains a similar structure as MDU ONU 400 illustrated in FIG. 4B. The only difference between the two MDU ONUs is that MDU ONU 700 includes a demultiplexer 710 within mux module 720, which allows two or more daisy chained MDU ONUs to transmit data at the same time over two different optical transceivers.

In operation, demultiplexer 710 is configured to take the output of transmit mux 430 and couple it to one of its two outputs at any given point in time based on, for example, the same control signal 485 used to control receive mux 435. Thus, if optical transceiver 415 is being used by ONU logic 425, then demultiplexer 710 is controlled to couple the output of transmit mux 430 to PON transmit input 450, while transmit bus output 460 is left floating. If, on the other hand, optical transceiver 415 is not being used by ONU logic 425, then demultiplexer 710 is controlled to couple the output of transmit mux 430 to transmit output 460, while PON transmit input 450 is left floating.

Figure 8:
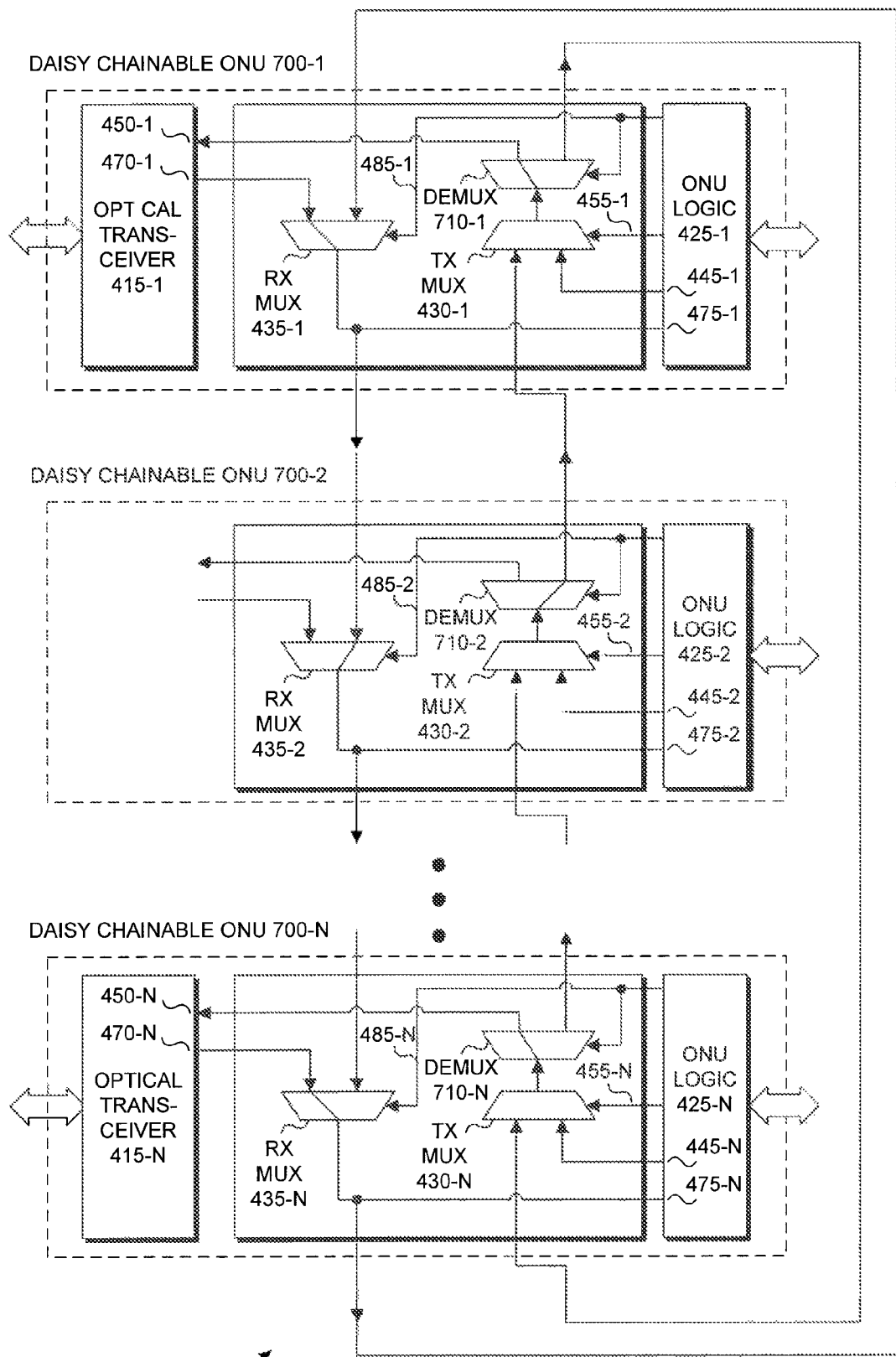
FIG. 8 illustrates a number of the MDU ONUs illustrated in FIG. 7 coupled together in a daisy chain fashion that are currently utilizing the added load balancing logic, according to embodiments of the present invention.

FIG. 8 illustrates a number of the MDU ONUs illustrated in FIG. 7 coupled together in a daisy chain fashion that are currently utilizing the added load balancing logic, according to embodiments of the presented invention. In particular, FIG. 8 illustrates N of the MDU ONUs illustrated in FIG. 7 coupled together in a daisy chain fashion, where N is an integer number.

As illustrated in FIG. 8, two optical transceivers—one in daisy chainable ONU 700-1 and the other in daisy chainable ONU 700-N—are being used to transmit and receive data simultaneously over the PON. A drop fiber (not shown) is coupled to each of these optical transceivers. Because both optical transceivers are being utilized simultaneously, the data to be sent and received over the PON by MDU ONUs 700-1-N can be distributed across these two optical transceivers. As specifically illustrated in FIG. 8, the optical transceiver in daisy chainable ONU 700-1 is being utilized by its ONU logic to send and receive data over the PON, as well as by the ONU logic of daisy chainable ONU 700-2 (and possibly by other daisy chainable ONUs farther daisy chained off of daisy chainable ONU 700-2). The optical transceiver of daisy chainable ONU 700-N is being utilized by its ONU logic to send and receive data over the PON.

Again, it should be noted that the positioning of the optical transceivers within the daisy chained ONUs in FIG. 7 can be positioned within other ones of the daisy chained ONUs and is not limited to the implementation shown.

5. Daisy Chainable ONU for MDUs with Added Multi-Directional Logic

Figure 9:
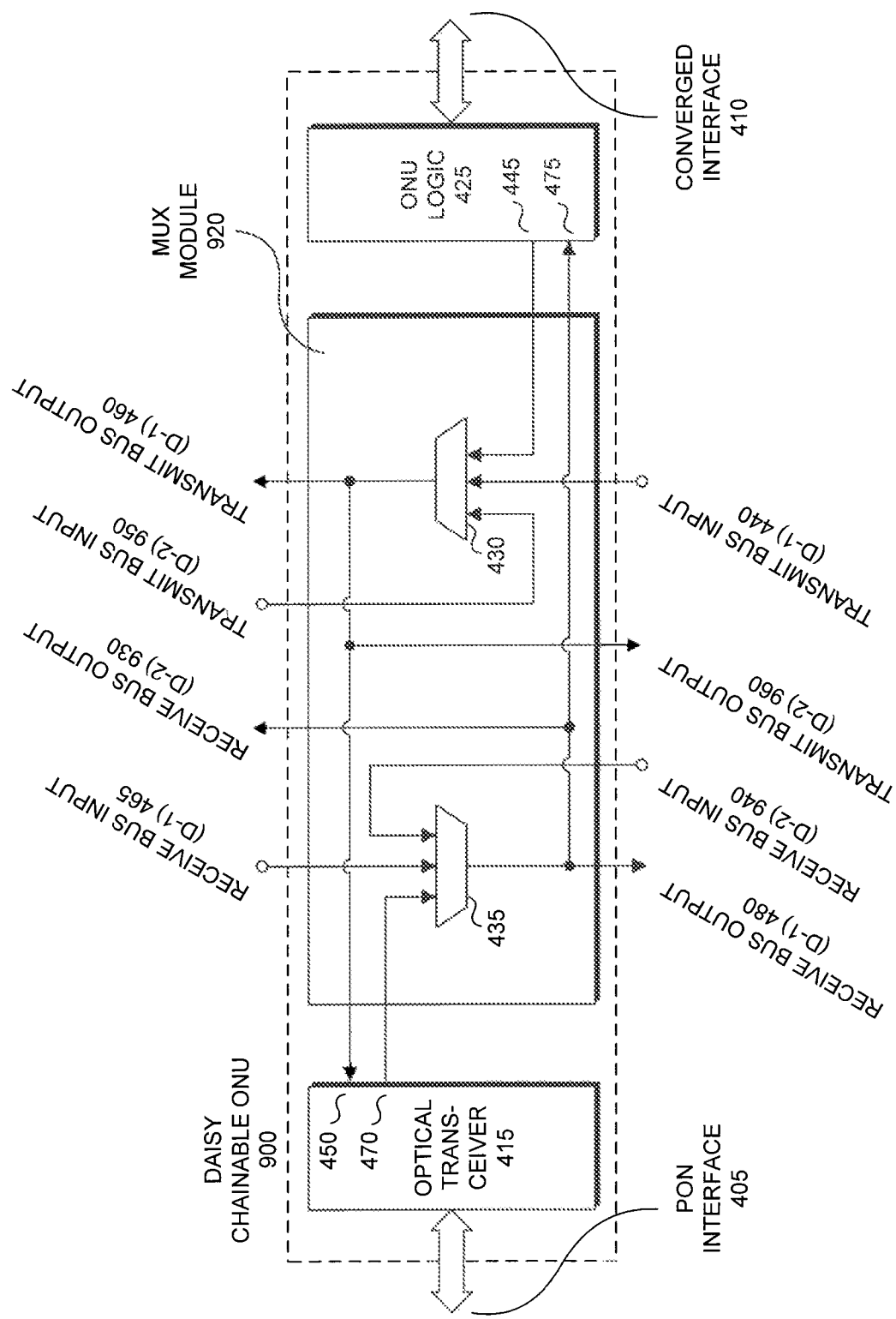
FIG. 9 illustrates a block diagram of a daisy chainable MDU ONU and implementation details of a MUX module contained therein having added bi-directional communication capability, according to embodiments of the present invention.

FIG. 9 illustrates a block diagram of a daisy chainable MDU ONU 900 and implementation details of a MUX module 920 contained therein having added bi-directional communication capability, according to embodiments of the present invention. In particular, MDU ONU 900 contains a similar structure as MDU ONU 400 illustrated in FIG. 4B. The only difference between the two MDU ONUs is that both transmit mux 430 and receive mux 435 have one additional input to provide for the bi-directional communication capability described further below.

In MDU ONU 400, illustrated in FIG. 4B, mux module 420 is capable of directly receiving data, received over the PON, from the MDU ONU coupled to its top i/o (i.e., coupled to i/o 460 and 465). Mux module 420 is not capable of directly receiving data, received over the PON, from the MDU ONU coupled to its bottom i/o (i.e., coupled to i/o 440 and 580). In MDU ONU 900, mux module 920 is capable of directly received data, received over the PON, from the MDU ONU coupled to its top i/o and to its bottom i/o. More specifically, mux module 920 can directly receive data, received over the PON, from the MDU ONU coupled to its top i/o via receive bus input (D-1) 465 and can directly receive data, received over the PON, from the MDU ONU coupled to its bottom i/o via receive bus input (D-2) 940, where D-1 and D-2 signify the difference in receive direction.

Moreover, in MDU ONU 400, illustrated in FIG. 4B, mux module 420 is capable of directly transmitting data, received over the PON, to the MDU ONU coupled to its bottom i/o (i.e., coupled to i/o 460 and 465). Mux module 420 is not capable of directly transmitting data, received over the PON, to the MDU ONU coupled to its top i/o (i.e., coupled to i/o 440 and 580). In MDU ONU 900, mux module 920 is capable of directly transmitting data, received over the PON, to the MDU ONU coupled to its top i/o and to its bottom i/o. More specifically, mux module 920 can directly transmit data, received over the PON, to the MDU ONU coupled to its top i/o via receive bus output (D-2) 930 and can directly transmit data, received over the PON, to the MDU ONU coupled to its bottom i/o via receive bus output (D-1) 480, where D-1 and D-2 signify the difference in transmit direction.

In MDU ONU 400, illustrated in FIG. 4B, mux module 420 is capable of directly transmitting data, for eventual transmission over the PON, to the MDU ONU coupled to its top i/o (i.e., coupled to i/o 460 and 465). Mux module 420 is not capable of directly transmitting data, for eventually transmission over the PON, to the MDU ONU coupled to its bottom i/o (i.e., coupled to i/o 440 and 580). In MDU ONU 900, mux module 920 is capable of directly transmitting data, for eventually transmission over the PON, to the MDU ONU coupled to its top i/o and to its bottom i/o. More specifically, mux module 920 can directly transmit data, for eventual transmission over the PON, to the MDU ONU coupled to its top i/o via transmit bus input (D-1) 460 and can directly transmit data, for eventual transmission over the PON, to the MDU ONU coupled to its bottom via transmit bus output (D-2) 960, where D-1 and D-2 signify the difference in transmit direction.

Moreover, in MDU ONU 400, illustrated in FIG. 4B, mux module 420 is capable of directly receiving data, for eventual transmission over the PON, from the MDU ONU coupled to its top i/o (i.e., coupled to i/o 460 and 465). Mux module 420 is not capable of directly receiving data, for eventually transmission over the PON, from the MDU ONU coupled to its bottom i/o (i.e., coupled to i/o 440 and 580). In MDU ONU 900, mux module 920 is capable of directly receiving data, for eventually transmission over the PON, from the MDU ONU coupled to its top i/o and to its bottom i/o. More specifically, mux module 920 can directly receive data, for eventual transmission over the PON, from the MDU ONU coupled to its top i/o via transmit bus input (D-2) 950 and can directly receive data, for eventual transmission over the PON, from the MDU ONU coupled to its bottom i/o via transmit bus input (D-1) 440, where D-1 and D-2 signify the difference in transmit direction.

Figure 10:
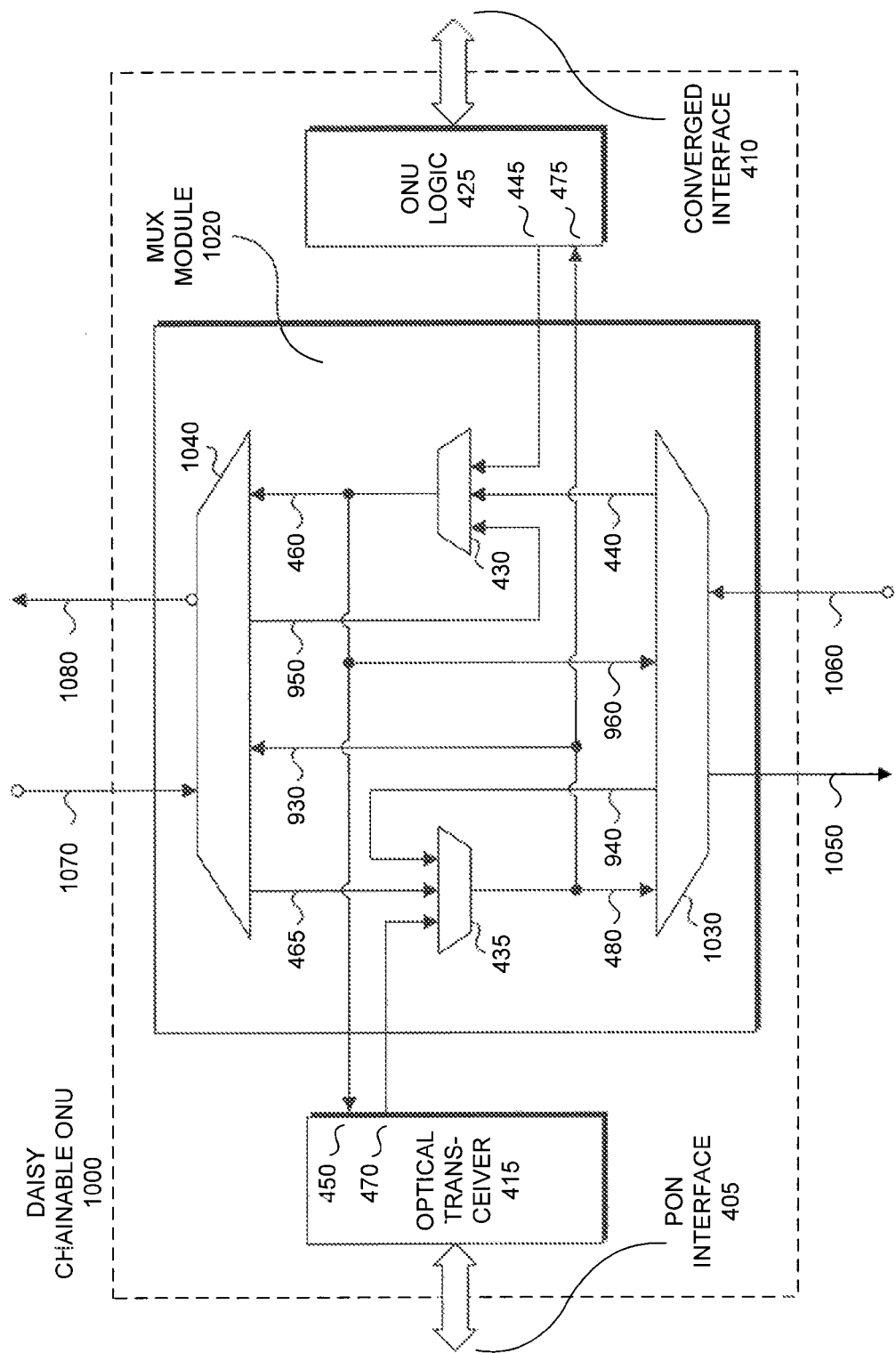
FIG. 10 illustrates another block diagram of a daisy chainable MDU ONU and implementation details of a MUX module contained therein having added bi-directional communication capability, according to embodiments of the present invention.

FIG. 10 illustrates another block diagram of a daisy chainable MDU ONU 1000 and implementation details of a MUX module 1020 contained therein having added bi-directional communication capability, according to embodiments of the present invention. In particular, MDU ONU 1000 contains a similar structure as MDU ONU 900 illustrated in FIG. 9. The only difference between the two MDU ONUs is that MDU ONU 1000 has two additional directional mux modules 1030 and 1040, within MUX module 102, for reducing the number of inputs and outputs of MDU ONU 1000. The two additional directional mux modules 1030 and 1040, as will be explained further below, are configured to select either the D-1 i/o or the D-2 i/o.

More specifically, directional mux module 1030 is configured to select either receive bus output (D-1) 480 and transmit bus input (D-1) 490 or receive bus input (D-2) 940 and transmit bus output (D-2) 960. The i/o combination selected by directional mux module 1030 is provided as i/o 1050 and 1060. Similarly, directional mux module 1040 is configured to select either receive bus input (D-1) 465 and transmit bus output (D-1) 460 or receive bus output (D-2) 930 and transmit bus input (D-2) 950. The i/o combination selected by directional mux module 1040 is provided as i/o 1070 and 1080.

6. Conclusion

It is to be appreciated that the Detailed Description section, and not the Abstract section, is intended to be used to interpret the claims. The Abstract section may set forth one or more but not all exemplary embodiments of the present invention as contemplated by the inventor(s), and thus, is not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A daisy chainable optical network unit (ONU) comprising:
   ONU logic comprising an ONU transmit output configured to provide end user data for transmission over a passive optical network (PON);
   an optical transceiver configured to receive an electrical signal at a PON transmit input and convert the electrical signal into an optical signal for transmission over the PON; and
   a multiplexer module comprising:
   a transmit multiplexer configured to couple a transmit bus input or the ONU transmit output to an output of the transmit multiplexer; and
   a load-balancing demultiplexer configured to couple the output of the transmit multiplexer to the PON transmit input or to a transmit bus output,
   wherein both the transmit bus input and the transmit bus output are configured to be coupled to a corresponding additional daisy chainable ONU.

2. The daisy chainable ONU of claim 1, wherein the ONU logic is configured to control the transmit multiplexer.

3. The daisy chainable ONU of claim 2, wherein the ONU logic is configured to control the transmit multiplexer to couple the ONU transmit output to the output of the transmit multiplexer if the ONU logic is currently providing the end user data for transmission over the PON.

4. The daisy chainable ONU of claim 3, wherein the ONU logic is configured to control the transmit multiplexer to couple the transmit bus input to the output of the transmit multiplexer if the ONU logic is not currently providing the end user data for transmission over the PON.

5. The daisy chainable ONU of claim 1, wherein the transmit bus input is configured to provide end user data from the corresponding additional daisy chainable ONU to the PON transmit input via the transmit multiplexer.

6. A daisy chainable optical network unit (ONU) comprising:
   ONU logic comprising an ONU transmit output configured to provide end user data for transmission over a passive optical network (PON); and
   a multiplexer module comprising:
   a transmit multiplexer configured to couple a transmit bus input or the ONU transmit output to an output of the transmit multiplexer; and
   a load-balancing demultiplexer configured to couple the output of the transmit multiplexer to a PON transmit input of an optical transceiver or to a transmit bus output,
   wherein both the transmit bus input and the transmit bus output are configured to be coupled to a corresponding additional daisy chainable ONU.

7. The daisy chainable ONU of claim 6, wherein the ONU logic is configured to control the transmit multiplexer.

8. The daisy chainable ONU of claim 7, wherein the ONU logic is configured to control the transmit multiplexer to couple the ONU transmit output to the PON transmit input if the ONU logic is currently providing the end user data for transmission over the PON.

9. The daisy chainable ONU of claim 8, wherein the ONU logic is configured to control the transmit multiplexer to couple the transmit bus input to the PON transmit input if the ONU logic is not currently providing the end user data for transmission over the PON.

10. The daisy chainable ONU of claim 6, wherein the transmit bus input is configured to provide end user data from the corresponding additional daisy chainable ONU to the PON transmit input via the transmit multiplexer.

11. The daisy chainable ONU of claim 6, wherein the ONU logic further comprises upstream queues for storing the end user data.

12. The daisy chainable ONU of claim 1, wherein the ONU logic further comprises upstream queues for storing the end user data.

13. The daisy chainable ONU of claim 1, wherein the ONU logic is configured to control the load-balancing demultiplexer to couple the output of the transmit multiplexer to the PON transmit input if the optical transceiver is currently being used to transmit optical signals over the PON.

14. The daisy chainable ONU of claim 1, wherein the ONU logic is configured to control the load-balancing demultiplexer to couple the output of the transmit multiplexer to the transmit bus output if the optical transceiver is not currently being used to transmit optical signals over the PON.

15. A multiplexer for implementation in a daisy chainable optical network unit (ONU), the multiplexer comprising:
 a transmit multiplexer configured to couple a transmit bus input or an ONU transmit output of the daisy chainable ONU to an output of the transmit multiplexer; and
 a load-balancing demultiplexer configured to couple the output of the transmit multiplexer to a passive optical network (PON) transmit input of an optical transceiver or to a transmit bus output,
 wherein both the transmit bus input and the transmit bus output are configured to be coupled to a corresponding additional daisy chainable ONU.

16. The mulitplexer of claim 15, wherein ONU logic is configured to control the transmit multiplexer.

17. The multiplexer of claim 16, wherein the ONU logic is configured to control the transmit multiplexer to couple the ONU transmit output to the output of the transmit multiplexer if the ONU logic is currently providing end user data for transmission over the PON.

18. The multiplexer of claim 17, wherein the ONU logic is configured to control the transmit multiplexer to couple the transmit bus input to the output of the transmit multiplexer if the ONU logic is not currently providing the end user data for transmission over the PON.

19. The multiplexer of claim 15, wherein the transmit bus input is configured to provide end user data from the corresponding additional daisy chainable ONU to the PON transmit input via the transmit multiplexer.

* * * * *